Oct. 23, 1928.

V. B. McLEAN 1,688,936

MACHINE FOR CLEANING DUST COLLECTOR TUBES

Filed Nov. 13, 1924     2 Sheets-Sheet 1

Vernon B. McLean, Inventor.
By Emil Neuhart
Attorney.

Witness:
J. J. Oberst.

Oct. 23, 1928.　　　　　　　　　　　　　　1,688,936
V. B. McLEAN
MACHINE FOR CLEANING DUST COLLECTOR TUBES
Filed Nov. 13, 1924　　　2 Sheets-Sheet 2
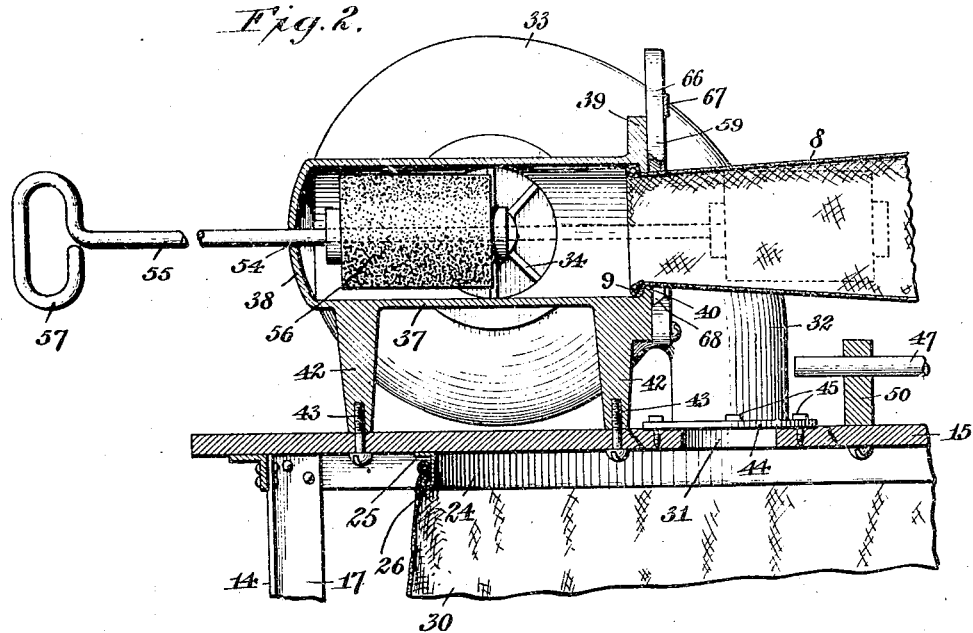
Witness:
J. J. Oberst.
Vernon B. McLean,
Inventor.
By Emil Neuhart
Attorney.

Patented Oct. 23, 1928.

1,688,936

UNITED STATES PATENT OFFICE.

VERNON B. McLEAN, OF BUFFALO, NEW YORK.

MACHINE FOR CLEANING DUST-COLLECTOR TUBES.

Application filed November 13, 1924. Serial No. 749,662.

My invention relates to improvements in machines for cleaning tubes of dust-collectors, such as employed in flour mills, elevators, cereal-food plants, and the like.

Many dust-collectors used in such places comprise a central chamber or barrel into which the dust-laden air is forced, and which has connected thereto a plurality of longitudinal series of radially-disposed fabric tubes extending outwardly therefrom and stretched from said chamber or barrel to frames properly supported and spaced from the chamber or barrel; the dust-laden air being forced through said tube and the dust being trapped within the tube and delivered into the chamber or barrel to be removed therefrom automatically, or otherwise. However, after passing the dust-laden air through the apparatus for a period of time, the interstices of the fabric become clogged by reason of the dust adhering to the inner sides of the tubes, and for this reason the effectiveness of the apparatus becomes impaired.

One of the objects of my invention is to provide an apparatus in which dust-collector tubes may be successively stretched in the manner in which they are used in the dust collector, and in attaching thereto a suction apparatus and providing a manually-operable brush adapted to be inserted into the stretched tube to remove the adhering dust from the interior thereof while creating suction within the tube, and to provide a dust receptacle into which the dust removed from the tube is delivered.

Another object is to provide a machine of this kind which is portable and which embodies, in combination a dust receptacle, means for stretching a dust-collector tube on the machine, a suction apparatus associated with the tube and said dust receptacle, and a friction cleaning-device associated with said tube, all arranged for convenient manipulation.

A further object is to provide a machine for cleaning tubes, which is simple, inexpensive and comparatively light in weight, so that it can be moved about to position the same in close proximity to the dust collector from which the tubes to be cleaned are to be taken, thus enabling the tubes to be removed one after another, or one longitudinal series after the other, and replaced as soon as cleaned.

The invention consists in the novel features of construction, and in the arrangement and combination of parts to be hereinafter described and more particularly pointed out in the subjoined claims.

In the drawings:—

Fig. 2 is a central vertical section on an enlarged scale taken through a portion of the upper end of the machine.

Fig. 3 is a plan view of a portion of the machine, part of the suction apparatus being broken away.

Fig. 4 is an inner end view of the suction apparatus.

Fig. 5 is a vertical section through the closed end of one of the dust-collector tubes showing the manner of connecting the same to the machine.

Fig. 6 is an enlarged cross section taken on line 6—6, Fig. 1.

Fig. 7 is a perspective view showing the outer end of the dust-collector tube and the yoke in which it is maintained.

Figure 1:
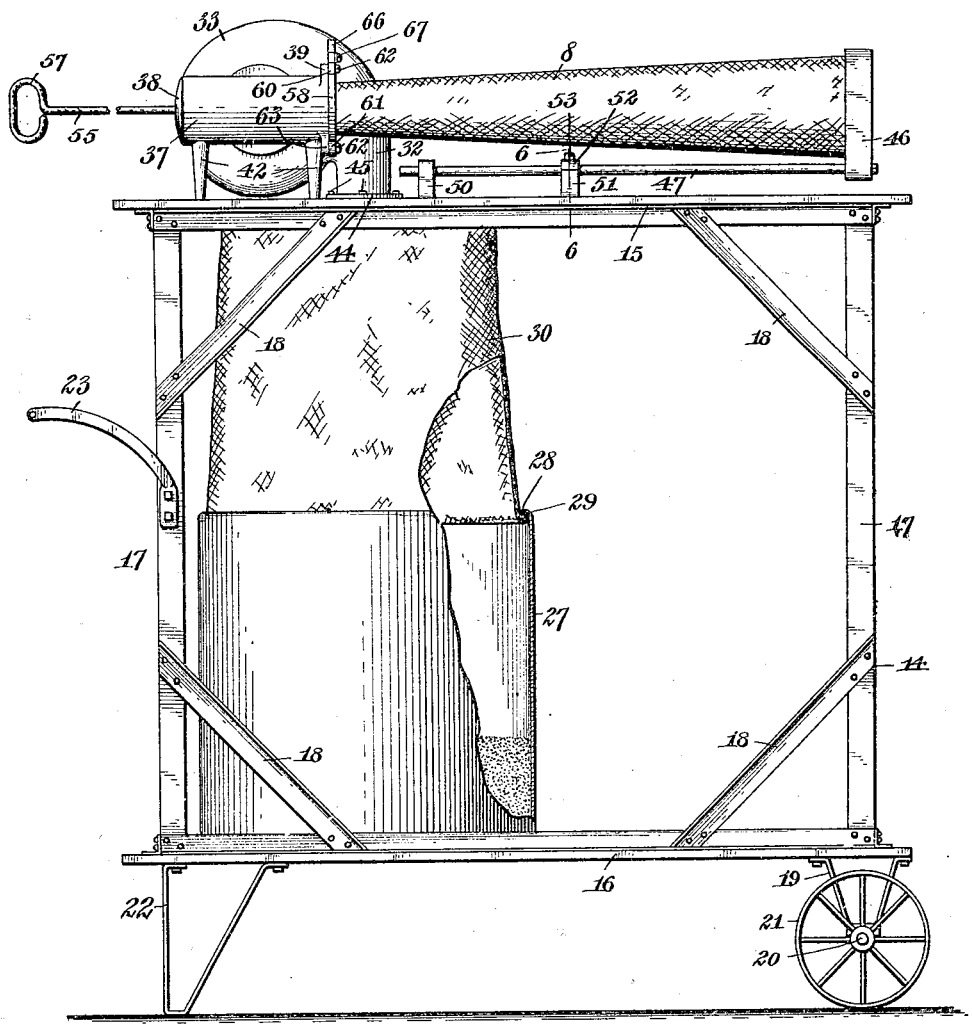
Fig. 1 is a side elevation of the machine, part of the dust receptacle and its tubular connection with the suction apparatus being broken away to better illustrate the invention.

Tubes of the kind to be cleaned by this machine, are illustrated in the accompanying drawings. Each tube is constructed of fabric, and into the same, dust-laden air is forced under pressure; the interstices of the tubes being of such small dimensions that the dust will be held captive while the air under pressure passes out through the interstices.

The fabric from which the tube is constructed is sewed to form a sleeve or tube 8, which tapers from one end thereof to the other, the smaller end being curved around a wire ring 9 and sewed to retain the ring therein, while the larger end is closed by a wooden block 10. This block is of oval formation and has a peripheral groove 11 therein, and the fabric of the tube is fastened to said block by a wire band 12 which is passed around the peripheral portion of the block with the fabric of the tube between the two, said ring and a portion of the fabric being fitted into the groove 11 of said block. Said block has centrally thereof a screw hole 13, to receive a fastening screw when fastening the tube in place on a dust-collector.

While my improved machine is adapted for cleaning dust-collector tubes of the type mentioned, other tubes or bags may be cleaned by means of this machine, but in that event, slight modifications in the means for supporting opposite ends of the tubes, or the bags, will have to be resorted to.

In the embodiment of my invention shown in the drawings, the invention is illustrated in the form of a portable machine, and it comprises a carriage or support 14 having an upper platform 15, a lower platform 16, and uprights 17 at the corners thereof connecting the upper and lower platforms. These uprights are braced to the platforms by brace members 18.

Secured to the under side of the lower platform 16 are brackets 19 which support an axle 20 having wheels 21 thereon. These brackets and wheels are at one end of the carriage or support, while at the opposite end thereof, legs 22 are fastened to the under side of the lower platform. The machine, therefore, receives support from the wheels 21 and the legs 22. At that end of the carriage or support having the legs 22 secured thereto, a handle 23 is provided by means of which the machine can be conveniently moved about, it being simply necessary to lift one end of the carriage so as to elevate the legs 22, then move the carriage about on its wheels 21.

On the under side of the upper platform 15 is a retainer ring 24, which is formed of a strip of sheet metal having an outstanding flange 25 at its upper edge by means of which said ring is secured to said platform, and the lower edge of said strip of metal is curved upon itself to form an external bead 26.

Placed upon the lower platform is a dust receptacle 27, which may be of any suitable cross-sectional formation, but which is preferably cylindrical. The upper end of the wall of said receptacle is curved inwardly and downwardly, as at 28, to form a downwardly-opening annular groove 29.

30 is a dust tube formed of fabric, sewed to approximately cylindrical form and having at its upper and lower edge a wire ring fastened in place by turning the fabric back around the same and sewing the turned portion of the fabric to the body portion thereof in a manner similar to the fastening of the wire ring 9 in the dust collector tube 8, shown in Fig. 2. The wired upper end of the tube 30 is forced over the retainer ring 24 and it is held in position by the external bead 26 thereof, while the wired lower end of said tube is fitted into the downwardly-opening annular groove 29 at the upper end of the dust receptacle 27.

The upper platform has a dust opening 31 formed therein, which opens into the dust tube 30, and this opening is in communication with the outlet tube 32 of a fan 33 secured to the upper side of said upper platform. Said outlet tube 32 extends tangentially from the fan casing 33 and said fan casing has a fan rotor 34 arranged therein for rotatable movement, said rotor being fastened to a shaft 35 driven by a suitable motor, or otherwise.

The eye of the fan has connected thereto a tube 36 extending laterally from a brush casing 37 which has its body portion of cylindrical formation and closed at its outer end, as at 38. The inner end of the brush casing is open and provided with an upstanding lug 39 and with an inwardly-directed annular retainer rib 40 provided with notches 41 at diametrically opposite points.

The brush casing is also provided with legs 42 by means of which it is supported by the upper platform, screws 43 being passed through said platform from the under side thereof and threaded into said legs to hold the brush casing in place.

The outlet 32 of the fan casing has an annular flange 44 at its lower end through which bolts 45 are passed that are threaded into the upper platform to hold said casing in proper position, and as the fan is directly connected with the brush casing 37, and the brush casing is rigidly secured to the platform, these parts are maintained in proper relation and held firmly against movement.

Spaced from the inner end of the brush casing 37 is a retainer yoke 46 fastened to a pair of parallel supporting rods 47. Said yoke has an opening 48 therein, the lower portion of which is of oval formation to conform to the oval formation of the outer end of a dust collector tube, and at the inner side of this yoke a retainer flange 49 is formed, which extends inwardly from the wall of the openings 48. The fabric covered oval block 10 of the dust collector tube is placed within the opening 48 by inserting the same from the upper end thereof, and the covered block bears against the retainer flange 49. The wired inner end of said dust collector tube is positioned behind the annular retainer rib 40 of the brush casing.

The parallel supporting rods 47 are guided for movement in brackets 50, 51, fastened to the upper side of the upper platform 15, the bracket 51 being a split bracket and having the upper portion 52 arranged to clamp downwardly onto the pair of supporting rods 47, and for this purpose, clamping bolts 53 are passed through said upper portion and threaded into the lower portion of said bracket 51. Therefore, when placing a dust collector tube in position, the clamping bolts 53 are loosened to allow the supporting rods 47 to move toward the brush casing 37 so as to bring the retainer yoke 46 closer to the outlet of said brush casing.

As the wire ring at the inner end of the dust collector tube is of larger diameter than the opening at the inner end of the brush casing, the wired inner end of said tube is placed in horizontal position and thrust through the notches 41 at diametrically opposite points of said opening, and after this wired inner end is thrust into the brush casing, the ring is swung into vertical position and drawn toward the inner side of the retainer bead 40. The fabric covered block of the tube is then inserted into the retainer yoke 46 and the yoke is moved outwardly to stretch the tube in the position shown in Fig. 1. When the tube is stretched, the clamp bolts 42 are tightened so as to clamp the upper portion 52 of the guide bracket 51 in firm contact with the parallel supporting rods so as to prevent movement of said rods in either direction. In this manner the dust collector tube is retained in stretched condition to be operated upon.

The closed end 38 of the brush casing has an opening 54 formed axially therein, and through this opening extends the rod 55 of a cylindrical brush 56, the brush being normally held in position within the brush casing 37 and the rod having a handle 57 at its outer end to conveniently manipulate the brush. The handle is preferably in the form of an elongated loop so that the brush can be conveniently thrust into the stretched dust-collector tube and moved back and forth and, if desired, rotated therein. The rod 55 of this brush is quite long and receives its support from the wall of the axial opening 54, and as said wall is the only support for the brush, the brush may be moved sidewise in any direction so that it may be brought into contact with every portion of the interior of the stretched dust collector tube. The operator taking hold of said brush and thrusting the same into the stretched tube, moves the brush back and forth, swings it laterally, upwardly, or downwardly to bring the same in contact with all points of the dust collector tube, and, if desired, rotates the same while imparting such movements thereto. After, or during the time the brush is operated within the dust-collector tube, the fan is set into motion, and as the open end of the tube is in direct communication with the brush casing 37 and said casing is connected directly with the eye of the fan, the fan rotor creates suction within the tube, drawing out the dust therefrom, and with the aid of the brush assuring thorough cleansing of the dust-collector tube.

The dust is drawn into the fan casing and forced out by the fan rotor through the outlet tube 32 of said fan. It is, of course, apparent that when drawing the dust from the interior of the dust-collector tube, air is drawn into the tube through the interstices of the fabric from which the tube is formed, and this air passes through the fan with the dust. The dust-laden air is then delivered from the fan into the receptacle 27; the dust-laden air, of course, passing from the fan through the opening 31 and through the dust tube 30. The air escapes through the interstices of said dust tube, while that portion of the dust not delivered directly into the dust receptacle accumulates on the inner side of the tube until it drops by its own weight. At intervals the dust tube 30 may be agitated or beaten from the exterior so as to assist in loosening the adhering dust from the inner surface thereof.

The means provided for connecting the dust-collector tubes to the brush casing, and for stretching the same, is simple and convenient to operate. It requires but very little time to attach a dust-collector tube, remove the same therefrom after being cleaned, and replace it with another. It may here be stated that in lieu of the clamp bolts 53, any other arrangement may be employed for clamping the supporting rods in position after adjusting the same to stretch the dust-collector tube.

Dust collectors of the type employing tubes, such as shown in the drawing, include tubes of different lengths and different diameters at their inner ends, although the wooden blocks closing the outer ends of the tubes are invariably of the same dimensions. The adjustment provided for the dust collector tubes, enables tubes of different lengths to be stretched on the machine, and those tubes having wire rings at their inner ends of larger diameter than the internal diameter of the brush casing, may be retained against the inner end of the brush casing by auxiliary retainer means. This auxiliary retainer means comprises two semi-circular members 58, 59, one of said members having securing lugs 60, 61 at opposite ends, through which securing screws 62 are passed and are respectively threaded into the upstanding lug 39 and an extension 63 formed on the inner end of the brush casing. The other semi-circular member has a pivot lug 64 at one end through which a pivot screw 65 is passed which is threaded into the extension 63, and a combined retainer lug and handle 66 at its other end.

To the securing lug 60, a retainer spring 67 is secured, said spring extending transversely over the combined retainer lug and handle 66 and bearing against the same to retain the pivoted semi-circular member in position. The inner concaved edges of the semi-circular members are beveled inwardly, as at 68, and when the member 59 is swung outwardly on its pivot, as shown in dotted lines in Fig. 4, one-half of the wired end of each of the larger size collector tubes will be inserted behind the beveled edge of the fixed semi-circular member 58, which will bring the remaining half of said wired end into position to be clamped by the pivoted semi-circular member 59 when swung inwardly against the fixed semi-circular member, or when swinging the same from the position shown in dotted lines in Fig. 4 to that shown in full lines. Provision is therefore made for retaining dust collector tubes having different diameters at their inner ends.

It is of course apparent that when tubes of a different kind, or bags, are to be cleaned, substitute means for retaining the open ends of the bags against the inner end of the brush casing will be employed and a substitute retainer device will also be required in place of the retainer yoke 46 shown and described in the drawings, but the mode of operation and the purpose of the remaining parts of the invention will remain the same.

Having thus described my invention, what I claim is:—

1. A machine for cleaning tubes, comprising means for holding a tube in stretched and fully opened condition, a suction device operatively connected with the interior of said tube so held, a brush normally retained within the connection between said suction device and the interior of said tube and supported for movement into and out of said tube and for rotary movement therein, a dust receptacle, and means of connection between said suction device and said dust receptacle.

2. A machine for cleaning tubes, comprising a fan, a brush casing connected with the eye of said fan and having means to connect the open end of a tube thereto, a brush arranged in said brush casing, means mounted in said brush casing to move said brush into said tube, and reversely, and a dust receptacle connected with the outlet of said fan.

3. A machine for cleaning tubes, comprising a support, a fan carried by said support, a brush casing connected with the eye of said fan and having an opening for connection with the open end of a tube to be cleaned, but being otherwise closed, means for holding a tube in stretched condition with the open end of said tube secured to said brush casing, a cylindrical brush within said brush casing adapted to be thrust into said tube, and means extending out of said brush casing to move said brush back and forth and rotate the same within said tube.

4. In a machine for cleaning tubes, the combination with a fan, means for holding a tube to be cleaned in stretched and opened condition, a casing having means to connect the open end of said tube thereto and having also conduit connection with the eye of said fan, and a brush in said casing having a brush rod extending therefrom through an opening in said casing opposite the open end thereof, said brush being adapted to be thrust from said casing into said tube for cleaning the same.

5. In a machine for cleaning dust-collector tubes, the combination with a support, of a fan carried by said support, a yoke adapted to receive and retain the closed end of a dust-collector tube, means for connecting the open end of said dust-collector tube with the eye of said fan, a pair of parallel rods to which said retainer is secured, and brackets on said support through which said parallel rods extend, one of said brackets having means to clamp said rods in adjusted position.

6. In a machine for cleaning dust-collector tubes provided with wired open ends, the combination with a support, of a dust receptacle, a fan having its outlet in communication with said dust receptacle, a cylindrical casing having a tube extending laterally therefrom and connected to the eye of said fan, said cylindrical casing being closed at one end, the other end of said casing having an annular rib provided with notches at diametrically opposite points, and adjustable means for supporting the closed end of a dust-collector tube, said dust-collector tube having its wired open end adapted to be thrust through the notches of said rib and to be positioned against the inner side of said rib.

7. A device for cleaning dust-collector tubes having wired open ends of different diameters, comprising a support, a dust receptacle carried by said support, a fan also carried by said support and having its outlet in communication with said dust receptacle, a tubular member connected laterally with the eye of said fan and having one end closed and its other end open, said tubular member having an inwardly-directed annular rib provided with opposite notches through which the wired end of the tubes of a given size are thrust and positioned against the inner side of said annular rib, and means at the open end of said tubular member for retaining the open ends of dust-collector tubes of larger diameter.

8. A machine for cleaning dust-collector tubes, comprising means for adjustably supporting the closed end of a dust-collector tube, a fan, a dust receptacle having communication with the outlet of said fan, a cylindrical casing having its axis coincident with the axis of said tube and having an open end to which the open end of said tube is secured and a closed end provided with a central opening, said casing having a lateral tubular extension connected with the eye of said fan, and a brush within said casing having a slidable rod extending outwardly through the opening at the closed end of said casing, said brush being adapted to be thrust into the stretched dust-collector tube to loosen adhering dust from the interior surface of the same.

In testimony whereof I affix my signature.

VERNON B. McLEAN.